United States Patent
Godfrey et al.

(10) Patent No.: US 10,306,864 B2
(45) Date of Patent: Jun. 4, 2019

(54) ROBOTIC ARM AND PREPARATION CUP SYSTEM

(71) Applicant: Technologies Holdings Corp., Houston, TX (US)

(72) Inventors: Robert J. Godfrey, Monona, WI (US); Bradley A. Schaller, Monona, WI (US)

(73) Assignee: Technologies Holdings Corp., Houston, TX (US)

( * ) Notice: Subject to any disclaimer, the term of this patent is extended or adjusted under 35 U.S.C. 154(b) by 452 days.

(21) Appl. No.: 15/249,646

(22) Filed: Aug. 29, 2016

(65) Prior Publication Data
US 2018/0054999 A1    Mar. 1, 2018

(51) Int. Cl.
| | | |
|---|---|---|
| A01J 5/003 | (2006.01) |
| A01J 5/017 | (2006.01) |
| A01J 7/00 | (2006.01) |
| B25J 19/02 | (2006.01) |
| A01J 5/08 | (2006.01) |
| A01J 7/04 | (2006.01) |

(52) U.S. Cl.
CPC .............. *A01J 5/0175* (2013.01); *A01J 5/08* (2013.01); *A01J 7/00* (2013.01); *A01J 7/04* (2013.01); *B25J 19/022* (2013.01); *G05B 2219/45113* (2013.01)

(58) Field of Classification Search
CPC .... A01J 5/0175; A01J 5/08; A01J 7/00; A01J 7/04; A01J 5/003
See application file for complete search history.

(56) References Cited

U.S. PATENT DOCUMENTS

| | | | | |
|---|---|---|---|---|
| 8,037,845 | B2 * | 10/2011 | Sjoblom | A01J 5/0175 |
| | | | | 119/14.08 |
| 9,807,973 | B2 * | 11/2017 | Hofman | A01J 5/0175 |
| 2012/0274761 | A1 | 11/2012 | Hofman et al. | |

FOREIGN PATENT DOCUMENTS

| | | |
|---|---|---|
| WO | WO 2007/027137 | 3/2007 |
| WO | WO 2015/094092 | 6/2015 |
| WO | WO 2016/079601 | 5/2016 |

OTHER PUBLICATIONS

European Patent Office, Communication, Application No. 17187815.0-1011; 4 pages, dated Jan. 8, 2018.
New Zealand Intellectual Property Office, New Zealand Second Office Action, Application No. 734806, dated Jul. 20, 2018, 2 pages.
(Continued)

*Primary Examiner* — Monica L Williams
(74) *Attorney, Agent, or Firm* — Baker Botts L.L.P.

(57) ABSTRACT

A system comprising a robotic arm, a plurality of grabbers, a sensor, and a preparation cup. The robotic arm has a first end and a recessed portion. The grabbers are coupled to the robotic arm at the first end. The sensor is positioned inside the recessed portion of the robotic arm at a first distance from the first end and at a first angle. The preparation cup is coupled to wings having a body portion, a first extended portion, and a second extended portion. The body portion is coupled to a portion of the preparation cup, the first extended portion extends in a first direction and the second extended portion extends in a second direction. The wings are operable to be magnetically coupled to the plurality of grabbers via the first and second extended portions.

20 Claims, 5 Drawing Sheets

(56) References Cited

OTHER PUBLICATIONS

New Zealand Intellectual Property Office, First Examination Report, Application No. 734806, dated Jun. 8, 2018, 4 pages.
IP Australia, Australian Office Action, Application No. 2017218947, dated Sep. 12, 2018, pp. 1-3.

* cited by examiner

ROBOTIC ARM AND PREPARATION CUP SYSTEM

TECHNICAL FIELD OF THE INVENTION

This disclosure generally relates to robotics and more specifically to a robotic arm and preparation cup system.

BACKGROUND OF THE INVENTION

Robotics are used in various industries to increase efficiencies. However, in some industries, if robotic devices are not configured correctly, the devices can have a detrimental effect. For example, in the dairy industry, robotic devices can injure or startle dairy livestock if the devices are not properly configure. Thus, specific configurations of robotic devices are needed to carefully and effectively use robotics in such industries.

SUMMARY OF THE INVENTION

A system comprising a robotic arm, a plurality of grabbers, a sensor, and a preparation cup is disclosed. The robotic arm has a first end and a recessed portion that is indented within the robotic arm. The plurality of grabbers are coupled to the robotic arm at the first end. The sensor is coupled to the robotic arm and positioned inside the recessed portion of the robotic arm. The sensor is positioned on the robotic arm at a first angle greater than zero degrees relative to the robotic arm. Further, the preparation cup is coupled to wings having a body portion, a first extended portion, and a second extended portion. The body portion is coupled to a portion of the preparation cup, the first extended portion extends in a first direction and the second extended portion extends in a second direction. The wings are operable to be removably coupled to the plurality of grabbers by magnetically coupling the first and second extended portions to one or more magnets positioned inside the plurality of grabbers.

The present embodiment presents several technical advantages. For example, in the present embodiment, a robotic arm is coupled to a sensor that is recessed within the robotic arm. This allows the robotic arm and the sensor to get close to a dairy livestock without colliding with the livestock. The present embodiment also discloses a preparation cup that has a lip which prevents the preparation cup from sliding off the robotic arm's grabbers. The present embodiment also discloses a preparation cup coupled to wings that can magnetically couple to the double grabber for a secure attachment onto the double grabber. Further, in the present embodiment, the double grabber may have sensors to confirm that the preparation cup is securely attached to the double grabber.

Certain embodiments of the present disclosure may include some, all, or none of these advantages. One or more other technical advantages may be readily apparent to those skilled in the art from the figures, descriptions, and claims included herein.

BRIEF DESCRIPTION OF THE DRAWINGS

To provide a more complete understanding of the present disclosure and the features and advantages thereof, reference is made to the following description taken in conjunction with the accompanying drawings, in which.

DETAILED DESCRIPTION OF THE INVENTION

Figure 1:
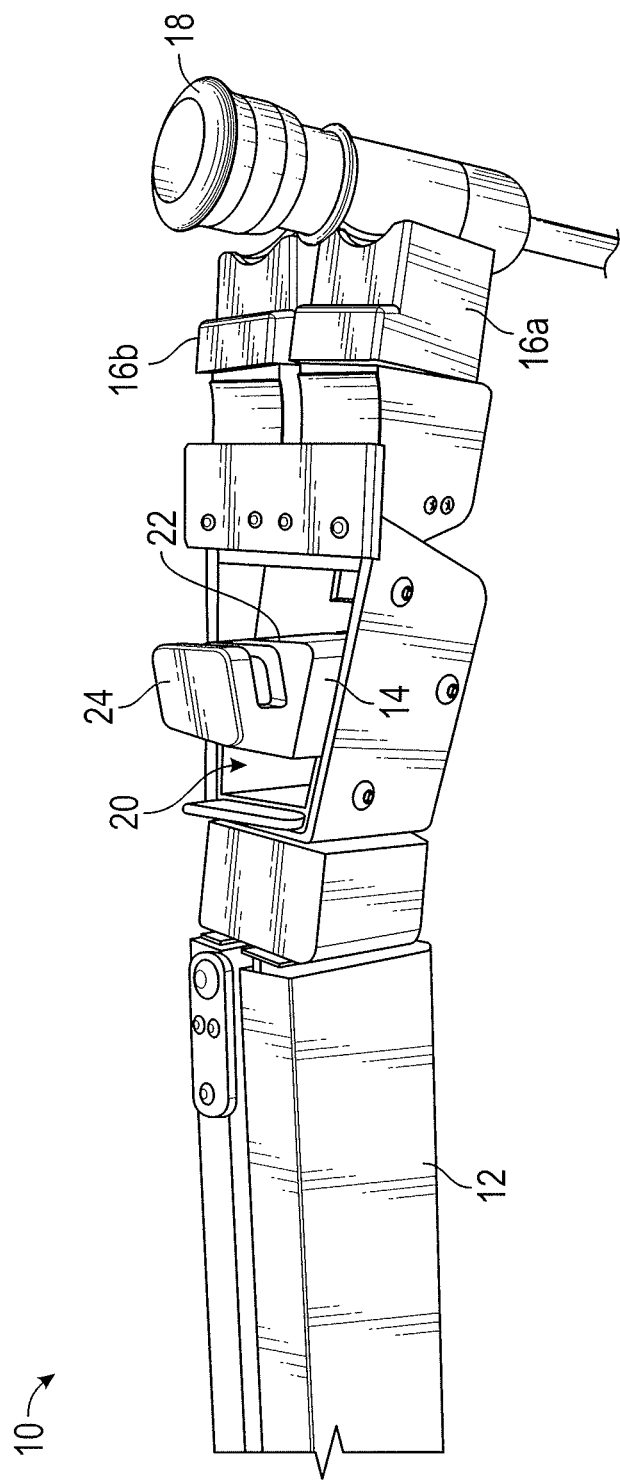
FIG. 1 illustrates a perspective view of the robotic arm and preparation cup system with a sensor.

Embodiments of the present disclosure are best understood by referring to FIGS. 1 through 5 of the drawings, like numerals being used for like and corresponding parts of the various drawings.

In various industries, robotic devices are used to effectively perform certain tasks. For example, in the dairy industry, robotic arms and sensors can be used to prepare and milk teats of a dairy livestock. One way of using robotics in the dairy industry is by using robotic arms for grabbing preparation or milking cups and placing the cups on a dairy livestock teat. But, before the robotic arm may position the cup onto the teat, a controller may need to determine the location of the teat. One way of determining this location of the teat is by placing a position sensor, such as a laser, on top of the robotic arm and using that sensor to scan its environment. In this manner, the sensor can detect livestock teats in its environment and then the robotic arm can position the preparation cup or milking cup onto the teat.

When using such robotics in the dairy industry, it can be advantageous to position the laser sensor so that it scans the area immediately above the preparation cup or milking cup when the cup is coupled to the robotic arm. In this manner, the laser can scan the area immediately above the preparation cup or milking cup as the robotic arm is moving toward the dairy livestock udder to determine if a teat is present in that area. If the sensor detects that a teat is present immediately above the teat preparation cup or milking cup, the robotic arm can accurately position the cup onto the teat. One way to configure such a system is by positioning the laser sensor so that it sits on top of the robotic arm and faces the preparation cup.

One drawback of such a configuration is that when the laser is positioned on top of the robotic arm, and the robotic arm moves toward the dairy livestock udder, the sensor is likely to collide with the livestock udder or other parts of the livestock's body. This can startle or injure the livestock. In some instances, the livestock may jolt and hit the robotic arm causing the preparation or milking cup to detach from the robotic arm. The livestock's movement may also cause the sensor to incorrectly detect that a teat is present at a certain location when, in fact, the livestock's movement has caused the teat to move to a different location. This can be highly inefficient as a user or the robotic arm may need to find a way to reattach the preparation or milking cup to the robotic arm or relocate the dairy livestock's teat and restart the entire teat preparation or milking process again.

To overcome these shortcomings, the present disclosure contemplates several novel and advantageous features of a robotic arm and preparation cup system. In one embodiment, the present system discloses a robotic arm that has a built-in recessed portion. This recessed portion is formed into the robotic arm and the sensor, such as a laser, is placed inside the recessed portion. This causes a portion of the sensor to sit within the recessed portion while a different portion of the sensor protrudes out of the recessed portion. So, for example, if a laser is positioned inside the recessed portion, the base of the laser may be positioned inside the recessed portion while the radiation-emitting body portion of the laser may protrude past the recessed portion. In this manner, the laser sensor has a lower profile on the robotic arm and is thus less likely to collide with the dairy livestock udder or body as the robotic arm is moving.

Further, in the same or different embodiment, the robotic arm may use a double grabber system to securely grab milking and preparation cups. In one embodiment, double grabbers may be used to couple with and move two milking cups at a time to attach those milking cups to two teats. In the embodiment of the present disclosure, the double grabbers are used to couple with one preparation cup at a time so that the milking system may sequentially prepare each of a plurality of livestock teats for milking. In this embodiment, the preparation cup is coupled to a pair of ferrous wings and the double grabber system magnetically couples the double grabbers to the wings of the preparation cup to securely fasten the preparation cup onto the robotic arm. As explained in greater detail in relation to the figures below, the preparation cup is positioned substantially in the middle of the ferrous wings. In this manner, when the double grabbers magnetically couple with the wings, the preparation cup is positioned in between the double grabbers. In various embodiments, this configuration allows the preparation cup to be centered between the double grabbers and/or be substantially in line with the sensor positioned on top of the robotic arm. In such embodiments, the sensor can scan the area above the preparation cup without needing to factor in a left or right offset.

The preparation cup and the wings may also have a lip formed on them that restricts the preparation cup's movement in one direction when the cup and wings are coupled to the double grabber. As described in greater detail in relation to FIGS. 3 and 5 below, this keeps the preparation cup from slipping off the double grabber while the robotic arm is moving. The double grabber may also have magnetic sensors that detect when the wings of the preparation cup are attached to the double grabber and communicate that information to a controller so that the robotic arm does not attempt to attach the preparation cup to a dairy livestock teat when a preparation cup is not securely coupled to the double grabber.

Although several features of a robotic arm and preparation cup system are mentioned here, various embodiments of the present disclosure may include some or all of these different features. Further, although the features are described as being in particular positions and comprising certain structural components, in other embodiments, the features may be positioned at any suitable location and may comprise any suitable structural components.

Figure 2:
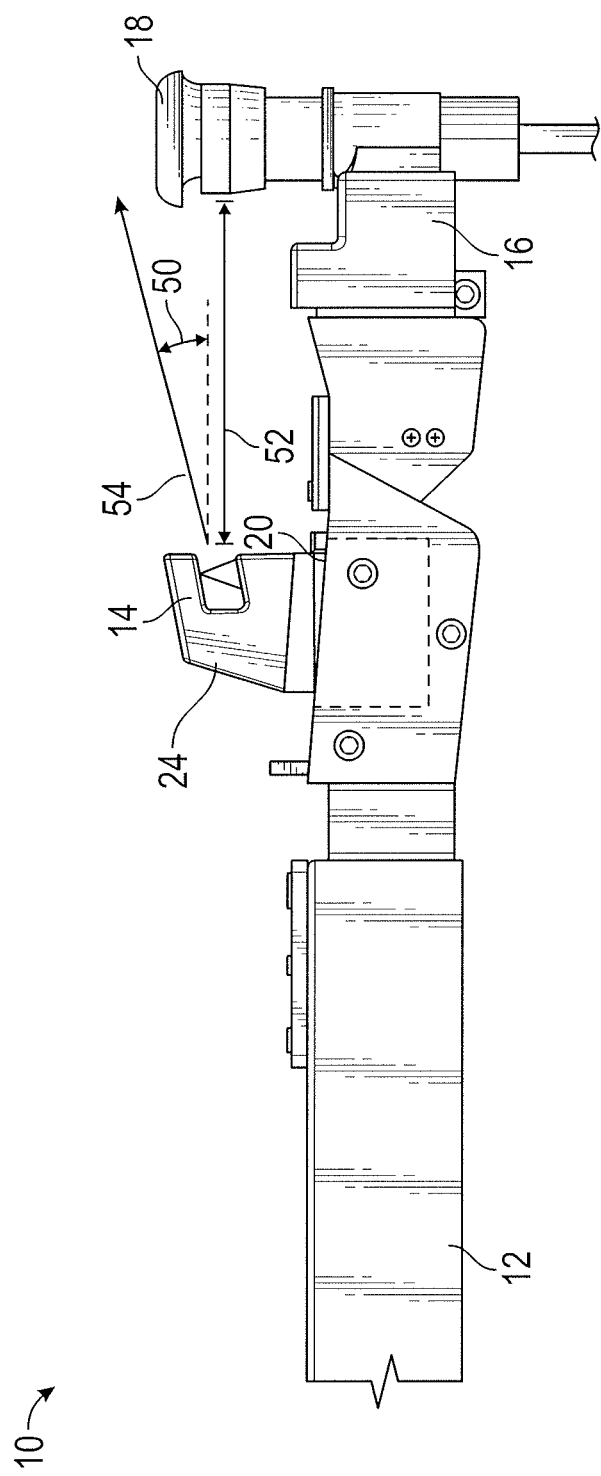
FIG. 2 illustrates a side view of the robotic arm and preparation cup system showing certain distances and angles.
Figure 3:
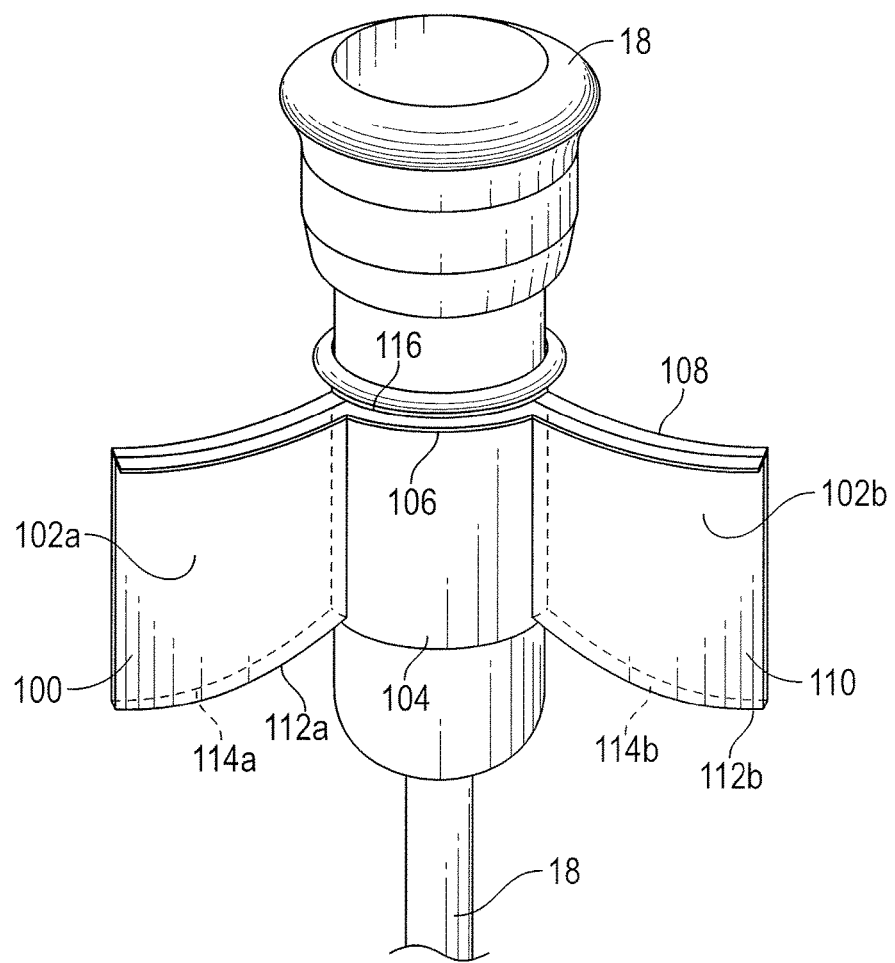
FIG. 3 illustrates a perspective view of a preparation cup coupled to wings.
Figure 4:
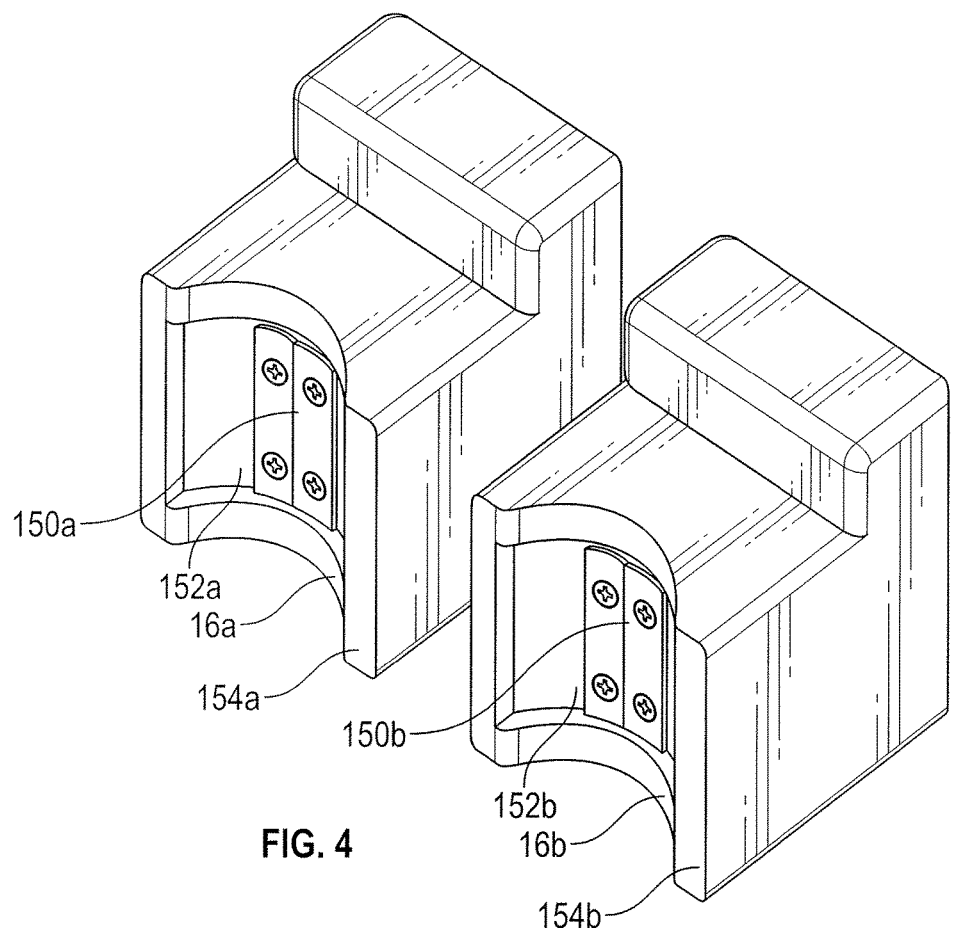
FIG. 4 illustrates a perspective view of the front of the doubles grabbers.
Figure 5:
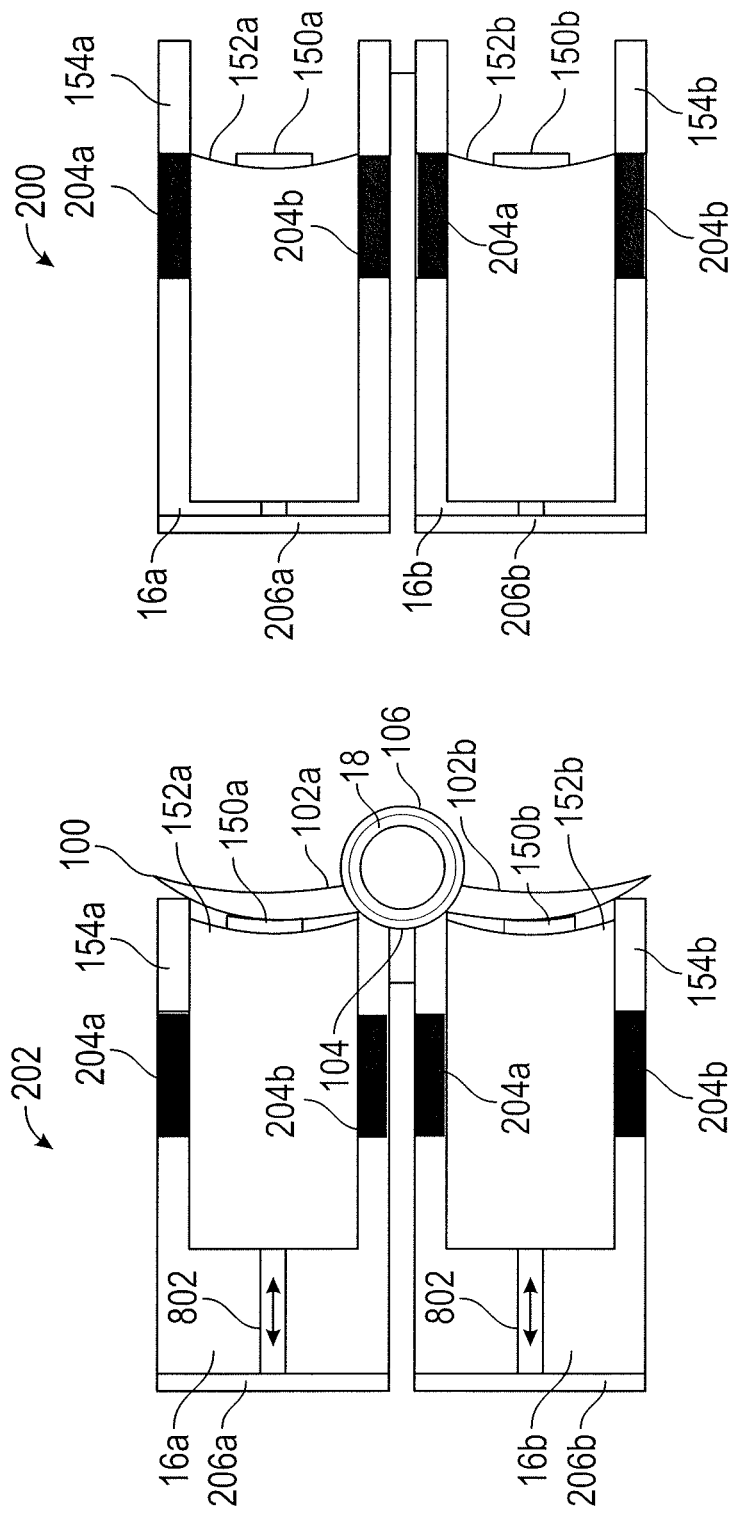
FIG. 5 illustrates a top-down view of the doubles grabbers in an extended and a retracted position.

The present disclosure will be described in more detail using FIGS. 1 through 5. FIG. 1 illustrates a perspective view of the overall robotic arm and preparation cup system with a sensor. FIG. 2 illustrates a side view of the overall system showing certain distances and angles. FIG. 3 illustrates a perspective view of a preparation cup coupled to wings. FIG. 4 illustrates a perspective view of the front of the doubles grabbers. And FIG. 5 illustrates a top-down view of the doubles grabbers in an extended and a retracted position.

FIG. 1 illustrates system 10 comprising a robotic arm 12, a sensor 14, grabbers 16a and 16b, and a preparation cup 18. In one embodiment, robotic atm 12 has a recessed portion 20 and sensor 14 is positioned inside recessed portion 20. Sensor 14 faces toward preparation cup 18. Preparation cup 18 is coupled to robotic arm 12 via grabbers 16a and 16b.

In system 10, robotic arm 12 is any electro-mechanical device that is operable to hold and move preparation cup 18. In one embodiment, sensor 14 is mounted upon robotic arm 12. Robotic arm 12 is operable to move along two or more axes to position preparation cup 18. Robotic arm 12 may be part of a larger robot such as a delta robot, Cartesian coordinate robot or any other similar robot. Robotic arm 12 may be operable to move at various velocities and may have any number of degrees of freedom. In one embodiment, robotic arm 12 is operable to receive instructions from a controller for moving preparation cup 18 to a predetermined location. Robotic arm 12 may be coupled to grabbers 16a and 16b.

Sensor 14 may be any electronic or electromechanical device, including a laser, sonar, camera, or other similar positional sensor, operable to scan an environment and capture positional data about the environment. In one embodiment, a sensor 14 is a laser sensor that scans its environment and captures data indicating the position of one or more teats of a dairy livestock present in the environment. Sensor 14 may have a base portion 22 and a body portion 24. In embodiments where sensor 14 is a laser sensor, body portion 24 of sensor 14 may comprise electronics for emitting radiation and measuring the distance of objects in sensor 14's environment. In one embodiment, the electronics in body portion 24 may emit light which may be used to measure the range of unobstructed space in the path of sensor 14 light. Base portion 22 may form an enclosure that houses additional electronics of sensor 14. In some embodiments, sensor 14 may be positioned on robotic arm 12 such that base portion 22 is recessed within the recessed portion 20 of robotic arm 12 and the radiation-emitting body portion 24 protrudes out of recessed portion 20 and is operable to transmit light beams toward preparation cup 18.

Grabbers 16a and 16b are mechanical or electro-mechanical devices that are positioned at one end of robotic arm 12 and may comprise one or more magnets that are operable to magnetically couple to preparation cup 18. Grabbers 16a and 16b may maintain a removable magnetic coupling between preparation cup 18 and robotic arm 12 while robotic arm 12 is moving. As discussed below with respect to FIGS. 4 and 5, grabbers 16a and 16b may further comprise magnet housings, holder slides, and other components. In various embodiments, grabbers 16a and 16b are operable to magnetically couple with two milking cups (not shown) at a time. In the present embodiment, grabbers 16a and 16b are further operable to magnetically couple with preparation cup 18 coupled to a plurality of wings as discussed in greater detail with respect to FIGS. 3 and 5 below.

Preparation cup 18 may be any suitable container or conduit through which fluid may flow. Preparation cup 18 may have multiple openings. A first opening of preparation cup 18 may be large enough for a livestock teat to be inserted into preparation cup 18. A second opening of preparation cup 18 may serve as an egress through which fluids may exit preparation cup 18. As discussed below with respect to FIG. 3 below, in some embodiments, preparation cup 18 may be coupled to one or more wings and preparation cup 18 may be removably coupled to grabbers 16a and 16b by the one or more wings. As further discussed in relation to FIG. 5 below, when preparation cup 18 is coupled to grabbers 16a and 16b, preparation cup 18 is positioned in between grabbers 16a and 16b.

In one embodiment, robotic arm 12 may have a recessed portion 20. Recessed portion 20 forms a cavity in robotic arm 12. In various embodiments, recessed portion 20 may be of any suitable size large enough for sensor 14 to be positioned inside recessed portion 20. For example, in some embodiments, recessed portion 20 may have a depth of one to two inches and a width of three to four inches. Additionally, the depth and/or width of recessed portion 20 may vary from one end of recessed portion 20 to a second end of recessed portion 20.

As illustrated in the embodiment of FIG. 1, sensor 14 may be positioned inside recessed portion 20. In one embodiment, sensor 14 may be positioned inside recessed portion 20 so that sensor 14 faces toward preparation cup 18. In this manner, sensor 14 may be operable to scan the area above preparation cup 18 to detect if preparation cup 18 is proximate to one or more dairy livestock teats. Further, in one embodiment, because preparation cup 18 is positioned in between grabbers 16a and 16b, preparation cup 18 is positioned substantially in line with sensor 14. Because preparation cup 18 is positioned substantially in line with sensor 14, in this embodiment, sensor 14 does not need to compensate for a significant radial left or right offset when determining if a dairy livestock teat is present proximate to preparation cup 18. In other embodiments, preparation cup 18 may be centered in between grabbers 16a and 16b but may not be in line with sensor 14. In yet another embodiment, preparation cup 18 may be centered in between grabbers 16a and 16b and be positioned in line with sensor 14.

In operation, robotic arm 12 uses grabbers 16a and 16b to hold a preparation cup 18 and move preparation cup 18. In such an embodiment, robotic arm 12 has a recessed portion 20 and sensor 14 is positioned inside recessed portion 20. This configuration results in sensor 14 having a low profile protruding from robotic arm 12. In this manner, if robotic arm 12 moves proximate to a dairy livestock including the dairy livestock udder, sensor 14 does not collide with the dairy livestock. In this embodiment, sensor 14 scans the environment above preparation cup 18 to determine if a dairy livestock teat is present near preparation cup 18. Further, as explained in greater detail below with respect to FIGS. 4 and 5, in this embodiment, grabber 16a and 16b both magnetically couple with wings attached to preparation cup 18 to securely fasten preparation cup 18 onto robotic arm 12. Robotic arm 12 then positions preparation cup 18 onto one dairy livestock teat at a time to prepare that teat for milking. In this manner, the same double grabbers 16a and 16b may couple with two milking cups at a time or one preparation cup 18 at a time.

FIG. 2 illustrates a side view of system 10 comprising robotic arm 12 having a recessed portion 20 and sensor 14 positioned inside recessed portion 20. FIG. 2 also illustrates a side view of grabber 16 attached to robotic arm 12 removably coupled to preparation cup 18.

In this embodiment, sensor 14 is a laser sensor 14. As shown, sensor 14 is positioned inside recessed portion 20 so that the radiation-emitting body portion 24 of sensor 14 faces toward preparation cup 18. Further, as shown, laser sensor 14 is positioned at an angle 50 inside recessed portion 20 so that laser sensor 14 is operable to scan the area above preparation cup 18. Angle 50 is the angle between robotic arm 12 and the direction 54 in which sensor 14 emits radiation. Angle 50 may be any suitable angle greater than zero degrees. In one embodiment, angle 50 is between ten and twenty degrees. In some embodiments, sensor 14 may be operable to scan at more than one angle 50 and angle 50 may span from zero degrees to any suitable angle.

FIG. 2 also illustrates distance 52 representing the distance between preparation cup 18 and sensor 14. As shown, sensor 14 may be positioned on robotic arm 14 a distance 52 away from preparation cup 18. In one embodiment, distance 52 may be any suitable distance such that when sensor 14 is positioned at distance 52 and scans the environment at angle 50, the radiation emitting body portion 24 of sensor 14 has an unobstructed view of the environment above preparation cup 18. Distance 52 may have any suitable value and may vary depending on the type of sensor 14 and the size of preparation cup 18. For example, distance 52 may be greater for taller preparation cups 18 and may be smaller for shorter preparation cups 18. In one embodiment, distance 52 may range from five to fifteen inches.

FIG. 3 illustrates a perspective view of preparation cup 18 coupled to wings 100. In the illustrated embodiment, preparation cup 18 further comprises a lip 106.

As shown, wings 100 comprise extensions 102a and 102b and a wing body 104. As shown, extension 102a is attached to one portion of wing body 104 and extension 102b is attached to another portion of wing body 104. In this manner, extensions 102a and 102b extend outward from wing body 104. Each extension 102a and 102b has a concave side 108 and a convex side 110. In one embodiment, wing body 104 and extensions 102a and 102b are all formed by bending or otherwise altering one extended ferrous material. In other embodiments, wing body 104 and extensions 102a and 102b may be made of separate pieces that are all joined together. Although FIG. 3 illustrates one type of wing 100, other embodiments may comprise other types of wings 100 including wings 100 made of non-ferrous materials, wings 100 with extensions 102a and 102b that are flat and do not have a concave side 108 and convex side 110, or any other similar device that is operable to couple a preparation cup 18 to a robotic arm 12.

In the illustrated embodiments, wings 100 have tapered portions 112a and 112b. Tapered portions 112a and 112b are cut-outs formed into extensions 102a and 102b. As shown, in some embodiments, tapered portions 112a and 112b form curved edges for extensions 102a and 102b. This results in angled corners for extensions 102a and 102b and reduces the overall size of wings 100 so that if preparation cup 18 and/or wings 100 fall into a grate or other opening, a user may maneuver wings 100 and use tapered portions 112a and 112b to more easily remove wings 100 from the grate or opening. Wings 100 may also have thickness 114a and 114b. The thickness 114a and 114b of wings 100 may be formed by any suitable material including material that is the same as or different from the material(s) that constitutes the rest of wings 100. Thickness 114a and 114b may further prevent wings 100 from falling into and getting stuck in small openings and crevices. For example, if wings 100 fall toward a small opening, thickness 114a and 114b of wings 100 may keep wings 100 from entering into and becoming stuck inside the opening.

Lip 106 may be any protrusion coupled to preparation cup 18. In one embodiment, lip 106 prevents grabbers 16a and 16b from sliding off of wings 100 and preparation cup 18 when wings 100 are magnetically coupled to grabbers 16a and 16b as illustrated below in FIG. 5. In some embodiments, lip 106 may have a hook 116 that attaches onto grabbers 16a and 16b. Further, in some embodiments, lip 106 and hook 116 may be formed upon wings 100 so that grabbers 16a and 16b do not slide off of grabbers 16a and 16b.

FIG. 4 illustrates a perspective view of grabbers 16a and 16b showing magnets 150a and 150b, magnet holders 152a and 152b, and holder slides 154a and 154b. As shown, magnets 150a and 150b are positioned inside magnet holders 152a and 152b. Magnet holders 152a and 152b are further positioned inside holder slides 154a and 154b.

Magnets 150a and 150b may be any suitable material that displays properties of magnetism. Magnets 150a and 150b may be permanent magnets or electro-magnets. Magnets 150a and 150b may comprise natural or artificial materials.

Magnet holders 152a and 152b may be any holder or structure onto which magnets 150a and 150b may be coupled or mounted. In various embodiments, magnets 150a and 150b may be coupled or mounted onto magnet holders 152a and 152b in any suitable manner including by being bolted, screwed, glued, or otherwise attached to magnet holders 152a and 152b. As illustrated in the embodiment of FIG. 5, the shape of magnet holders 152a and 152b may correspond to the shape of extensions 102a and 102b of wings 100. Thus, in some embodiments, magnet holders 152a and 152b are substantially concave. In such embodiments, the concavity of magnet holders 152a and 152b may, as illustrated in FIG. 5, correspond to the convexity of extensions 102a and 102b of wings 100.

Holder slides 154a and 154b may form the outer frame of grabbers 16a and 16b. Magnet holders 152a and 152b may be positioned within holder slides 154a and 154b. As illustrated in FIG. 5 and discussed in greater detail below, in some embodiments, magnet holders 152a and 152b may be operable to slide along holder slides 154a and 154b to move back and forth within grabbers 16a and 16b. FIG. 5 illustrates a top-down view of grabbers 16a and 16b comprising magnets 150a and 150b, magnet holders 152a and 152b, and holder slides 154a and 154b. Grabbers 16a and 16b further comprise magnetic detectors 204a and 204b.

In this illustrated embodiment, grabbers 16a and 16b are shown in retracted position 200 and extended position 202. When grabbers 16a and 16b are in retracted position 200, magnets 150a and 150b and magnet holders 152a and 152b are recessed within grabbers 16a and 16b. When grabbers 16a and 16b are in extended position 202, magnets 150a and 150b and magnet holders 152a and 152b are positioned along a first end of holder slides 154a and 154b so that magnets 150a and 150b face out of grabbers 16a and 16b. As shown, in retracted position 200, magnets 150a and 150b are recessed within grabbers 16a and 16b. Accordingly, in retracted position 200, grabbers 16a and 16b are not operable to be magnetically coupled with wings 100 and preparation cup 18.

In extended position 202, magnets 150a and 150b face out of grabbers 16a and 16b and are operable to magnetically couple with wings 100 and preparation cup 18. As shown, when grabbers 16a and 16b are in extended position 202, extended portion 102a and 102b of wings 100 are operable to couple with magnets 150a and 150b respectively. In this manner, when wings 100, coupled to preparation cup 18, are magnetically coupled to grabbers 16a and 16b, preparation cup 18 is positioned in between grabbers 16a and 16b and is substantially aligned with robotic arm 12. Further, as shown, lip 106 is formed on preparation cup 18 and is positioned such that when preparation cup 18 is coupled to double grabbers 16a and 16b, lip 106 is positioned above double grabbers 16a and 16b. The positioning of lip 106 prevents preparation cup 18 from sliding off of double grabbers 16a and 16b as double grabbers 16a and 16b turn and move preparation cup 18.

As indicated by arrows 208, magnet holders 152a and 152b are operable to slide back and forth inside holder slides 154a and 154b. Magnet holders 152a and 152b may slide via any suitable manner. For example, magnet holders 152a and 152b may be coupled to retraction and extension mechanism 206a and 206b including any cylinders, hydraulics, or other components that are operable to retract or extend magnet holders 152a and 152b within grabbers 16a and 16b. Retraction and extension mechanism 206a and 206b may comprise any device or mechanism operable to push or pull magnet holders 152a and 152b so that magnet holders 152a and 152b slide along the inside of holder slides 154a and 154b.

Magnet holders 152a and 152b are positioned inside holder slides 154a and 154b in any suitable manner. For example, magnet holders 152a and 152b may be of a smaller size than holder slides 154a and 154b so that when the retraction and extension mechanism 206a and 206b push or pull magnet holders 152a and 152b, magnet holders 152a and 152b slide on the inner surface of holder slides 154a and 154b. In other embodiments, there may be guide tracks, bearings, or other friction reducing elements positioned in between magnet holders 152a and 152b and holder slides 154a and 154b so that magnet holders 152a and 152b may more easily slide along holder slides 154a and 154b. As shown, in one embodiment, magnet holders 152a and 152b have a substantially concave surface. The concavity of magnet holders 152a and 152b corresponds to the convexity of extensions 112a and 112b of wings 100. In this manner, extensions 112a and 112b fit inside magnet holders 152a and 152b.

As illustrated in FIG. 5, grabbers 16a and 16b further comprise magnetic detectors 204a and 204b. Magnetic detectors 204a and 204b are any devices or sensors, such as Hall effect sensors, that detect a variation in a magnetic field. For example, magnetic detectors 204a and 204b may transmit output voltages that vary depending upon the proximity of magnetic detectors 204a and 204b to magnets 150a and 150b. In some embodiments, magnetic detectors 204a and 204b may be positioned inside grabbers 16a and 16b such when grabbers 16a and 16b are in extended position 202, magnets 150a and 150b are distant from magnetic detectors 204a and 204b and when grabbers 16a and 16b are in retracted position 200, magnets 150a and 150b are proximate to magnetic detectors 204a and 204b. In other embodiments, magnetic detectors 204a and 204b may be positioned at other portions of grabbers 16a and 16b, such as near the face of grabbers 16a and 16b, so that magnetic detectors 204a and 204b register a larger magnetic field when grabbers 16a and 16b are in extended position 202 and a lower magnetic field when grabbers 16a and 16b are in retracted position 200.

In operation, when grabbers 16a and 16b are in extended position 202, grabbers 16a and 16b are operable to magnetically couple with wings 100. While grabbers 16a and 16b are coupled to wings 100, magnets 150a and 150b are distant from magnetic detectors 204a and 204b. Magnetic detectors 204a and 204b thus detect a low magnetic field and transmit information indicating that wings 100 and preparation cup 18 are coupled to grabbers 16a and 16b. When preparation cup 18 and wings 100 either fall off of or are otherwise no longer coupled to grabbers 16a and 16b, retraction and extraction mechanism 206a and 206b retract magnet holders 152a and 152b into holder slides 154a and 154b. In this retracted position 200, magnets 150a and 150b move proximate to magnetic sensors 204a and 204b. Magnetic sensors 204a and 204b thus detect a larger magnetic field and transmit information indicating that wings 100 and preparation cup 18 are not coupled to grabbers 16a and 16b.

Although several embodiments have been illustrated and described in detail, it will be recognized that substitutions and alterations are possible without departing from the spirit and scope of the present disclosure, as defined by the appended claims. To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system comprising:
   a robotic arm having a first end and a recessed portion that is indented within the robotic arm;
   a plurality of grabbers coupled to the robotic arm at the first end;
   a sensor coupled to the robotic arm and positioned inside the recessed portion of the robotic arm, the sensor being positioned on the robotic arm at a first angle greater than zero degrees relative to the robotic arm; and
   a preparation cup coupled to wings, the wings having a body portion, a first extended portion, and a second extended portion;
   wherein the body portion of the wings is coupled to a portion of the preparation cup, the first extended portion extends in a first direction and the second extended portion extends in a second direction, wherein the wings are operable to be removably coupled to the plurality of grabbers by magnetically coupling the first and second extended portions to one or more magnets positioned inside the plurality of grabbers.

2. The system of claim 1, wherein the preparation cup has a lip to keep the preparation cup from slipping when the preparation cup is coupled to the grabbers.

3. The system of claim 1, wherein the sensor is a laser that faces toward the preparation cup.

4. The system of claim 1, wherein the grabbers further comprise magnet holders that are operable to retract into the grabbers.

5. The system of claim 1, wherein the grabbers further comprise a plurality of magnetic sensors, each magnetic sensor being operable to detect if a wing is coupled to a grabber.

6. The system of claim 1, wherein the wings further comprise one or more tapered edges to facilitate removing the wings from an opening.

7. The system of claim 1, wherein each extended portion of the wings has a convex side and a concave side, and wherein the wings are operable to be removably coupled to the plurality of grabbers by magnetically coupling the convex side of each wing to one or more magnets positioned inside the plurality of grabbers.

8. A method comprising:
   magnetically coupling a preparation cup coupled to a plurality of wings to a plurality of grabbers of a robotic arm;
   scanning an environment above the preparation cup using a sensor coupled to a robotic arm, wherein the sensor is positioned inside a recessed portion of the robotic arm at a first angle greater than zero degrees relative to the robotic arm; and
   determining if the preparation cup is magnetically coupled to the plurality of grabbers by using a plurality of magnetic sensors to detect if magnets positioned inside the plurality of grabbers are proximate to the magnetism sensors.

9. The method of claim 8, wherein magnetically coupling the preparation cup to the wings further comprises coupling a body portion of the wings to a portion of the preparation cup so that a first extended portion coupled to the body of the wings extends past the body portion in a first direction and a second extended portion coupled to the body of the wings extends past the body portion in a second direction.

10. The method of claim 8, wherein each extended portion of the wings has a concave side and a convex side and wherein magnetically coupling the preparation cup to the wings further comprises magnetically coupling the convex sides of each extended portion to one or more magnets positioned inside the plurality of grabbers.

11. The method of claim 8, wherein the preparation cup has a lip to keep the preparation cup from slipping when the preparation cup is coupled to the grabbers.

12. The method of claim 8, wherein the sensor is a laser that faces toward the preparation cup.

13. The method of claim 8, wherein the wings further comprise one or more tapered edges to facilitate removing the wings from an opening.

14. The method of claim 8, wherein the wings have a thickness so that the wings do not fall into a grate opening.

15. An apparatus comprising:
   a preparation cup having a body portion;
   a set of wings having a body, a first extension, and a second extension, the first extension coupled to a first portion of the wing body and extending in a first direction and the second extension coupled to a second portion of the wing body and extending in a second direction and wherein each of the first and second extensions has a convex side and a concave side; and
   wherein the wings are operable to be removably coupled to a plurality of grabbers by magnetically coupling the convex sides of each wing to one or more magnets positioned inside the plurality of grabbers.

16. The apparatus of claim 15, wherein the wings further comprise one or more tapered edges to facilitate removing the wings from an opening.

17. The apparatus of claim 15, wherein the grabbers further comprise a plurality of magnetic sensors operable to detect if the wings are coupled to the grabbers.

18. The apparatus of claim 15, wherein the grabbers further comprise magnet holders that are operable to retract into the grabbers.

19. The apparatus of claim 15, wherein the preparation cup has a lip to keep the preparation cup from slipping when the preparation cup is coupled to the grabbers.

20. The apparatus of claim 19, wherein the lip further comprises a hook, the hook being operable to engage with the plurality of grabbers.

* * * * *